United States Patent [19]

Juso et al.

[11] Patent Number: 5,446,911
[45] Date of Patent: Aug. 29, 1995

[54] APPARATUS FOR AUTOMATICALLY PREPARING A FLOWCHART BY ANALYZING A SOURCE PROGRAM AND A LIST OF JUMP COMMANDS

[75] Inventors: Hiromi Juso, Gose; Takeshi Tanaka, Higashihiroshima, both of Japan

[73] Assignee: Sharp Kabushiki Kaisha, Osaka, Japan

[21] Appl. No.: 164,761

[22] Filed: Dec. 10, 1993

Related U.S. Application Data

[63] Continuation of Ser. No. 614,454, Nov. 16, 1990, abandoned.

[30] Foreign Application Priority Data

Nov. 16, 1989 [JP] Japan ............................. 1-299012

[51] Int. Cl.$^6$ ............................................. G06F 9/00
[52] U.S. Cl. ............................. 395/800; 364/DIG. 1; 364/259; 364/259.2; 364/260.4; 364/261.1; 364/267.4
[58] Field of Search ............... 395/800, 375, 500, 575, 395/700, 140, 775; 369/136, 191; 371/19

[56] References Cited

U.S. PATENT DOCUMENTS

| | | | |
|---|---|---|---|
| 3,781,807 | 12/1973 | Saltini | 395/375 |
| 4,115,853 | 9/1978 | Dummermuth | 395/775 |
| 4,789,924 | 12/1988 | Fukuta | 395/500 |
| 4,823,307 | 4/1989 | Melgara et al. | 371/19 |
| 4,852,047 | 7/1989 | Lavallee et al. | 364/191 |
| 4,872,167 | 10/1989 | Maezawa et al. | 371/19 |
| 4,879,678 | 11/1989 | Kurokowa et al. | 395/775 |
| 4,943,968 | 7/1990 | Hirose et al. | 371/19 |
| 4,953,084 | 8/1990 | Meloy et al. | 371/19 |
| 5,038,348 | 8/1991 | Yoda et al. | 371/19 |
| 5,048,018 | 9/1991 | Bernstein et al. | 371/19 |
| 5,119,377 | 6/1992 | Cobb et al. | 371/19 |
| 5,129,046 | 7/1992 | Tanabe et al. | 395/100 |
| 5,142,679 | 8/1992 | Owaki et al. | 395/700 |

FOREIGN PATENT DOCUMENTS

3302715A1 8/1984 Germany.

*Primary Examiner*—Mehmet Geckil

[57] ABSTRACT

A source program is stored for every line of the source program in a source program memory. Jump commands in the language used in the program are previously stored in a jump command memory for storing jump commands used in the program. The contents of the source program memory are compared with the contents of the jump command memory, the kinds of each commands in the source program are identified, and first and second identification data are produced. The first identification data which are set for each command identifies the kind of each command, and identifies that the execution contents of commands adjacent to each other along the sequence of commands are continuous. The second identification data are set for each jump command and each command to which processing is to be jumped. The first and second identification data are stored in the identification data memory. The process flow of the source program is analyzed based on the contents of the identification data memory in an analyzer. The result of the analysis by the analyser is output in the form of a flowchart.

5 Claims, 7 Drawing Sheets

APPARATUS FOR AUTOMATICALLY PREPARING A FLOWCHART BY ANALYZING A SOURCE PROGRAM AND A LIST OF JUMP COMMANDS

This application is a continuation of application Ser. No. 07/614,454, filed on Nov. 16, 1990, now abandoned.

BACKGROUND OF THE INVENTION

1. Field of the Invention

This invention relates to an apparatus for automatically preparing a flowchart, and more particularly to an apparatus for preparing a flowchart, for example, by analyzing a source program written in an assembler language used in a microcomputer.

2. Description of the Background Art

In recent years, microcomputers have come to be used in all types of electronic devices. A microcomputer includes a ROM (Read Only Memory) into which the operating program is stored. In such a microcomputer, intricate and diverse control can be realized with an increase in the size of the program (i.e., the increased capacity of a ROM). This kind of operating program is usually written in an assembler language, and its debugging is performed by visual observation of the assembler list.

In this environment, there are problems in that a great deal of labor is required for debugging a program, and that errors easily occur in the debugging. A flowchart is prepared in order to comprehend the flow of processing of the source program. When a change in the source program occurs after it has been once prepared, the flowchart must be changed through visual observation, and the above-mentioned problems also arise in such changing processes. Furthermore, a number of types of microcomputer are in distribution, and when a change is made in the type of microcomputer being used, the type of the corresponding assembler language must also be changed as a result. In such cases, therefore, it is difficult to perform the changes in the source program, which accompanies this kind of change in the assembler language, through visual observation.

SUMMARY OF THE INVENTION

The apparatus of this invention, which overcomes the above-discussed and numerous other disadvantages and deficiencies of the prior art, includes a source program memory for storing lines of the source program; a jump command memory for storing jump commands used in the source program; an identification data producing unit for comparing the contents of the source program memory with the contents of the jump command memory, and for producing first and second identification data, the first identification data being set for each command, identifying the kind of each command, and identifying that the execution contents of commands adjacent to each other along the sequence of commands are continuous, the second identification data being set for each jump command and each command to which processing is to be jumped; an identification data memory for storing the first and second identification data; an analyzer for analyzing the process flow of the source program based on the contents of the identification data memory and an output unit for outputting the result of the analysis by the analyzer in the form of a flowchart.

Preferably, the first identification data may include: first data indicative of the kind of the contents of the corresponding line; second data indicative that the corresponding line is a continuation line or the first command in one block; and third data indicative of the command or label of the corresponding line.

Preferably, the second identification data may include first data indicative of the address to which processing is to be jumped.

Preferably, the address is a relative address.

Preferably, said second identification data includes second data indicative of the location of the jump command and third data indicative of the location to which processing is to be jumped.

Preferably, the second identification data further includes fourth data indicative of the difference of the second data and the third data.

According to the invention, a source program is stored for every line of the source program in the source program memory. Jump commands in the language used in the source program are previously stored in the jump command memory for storing jump commands used in the source program. The identification data producing unit compares the contents of the source program memory with the contents of the jump command memory, identifies the type of each commands in the source program, and produces first and second identification data. The first identification data which are set for each command identifies the type of each command and identifies whether the execution contents of commands adjacent to each other along the sequence of commands are continuous. The second identification data are set for each jump command and each command to which processing is to be jumped. The first and second identification data are stored in the identification data memory. The process flow of the source program is analyzed based on the contents of the identification data memory. The result of the analysis by the analyser is output in the form of a flowchart.

Thus, the invention described herein makes possible the objectives of:

(1) providing a system for automatically preparing a flowchart;

(2) providing a system in which, even when a source program is changed, the flowchart can be easily, rapidly and accurately changed in accordance with the change of the source program; and (3) providing a system in which, even when the type of language is changed, the flowchart can be easily, rapidly and accurately changed in accordance with the change in the kind of the language.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

This invention may be better understood and its numerous objects and advantages will become apparent to those skilled in the art by reference to the accompanying drawings which are given by way of illustration only, and thus are not limitative of the present invention, and wherein.

DESCRIPTION OF THE PREFERRED EMBODIMENTS

Figure 1:
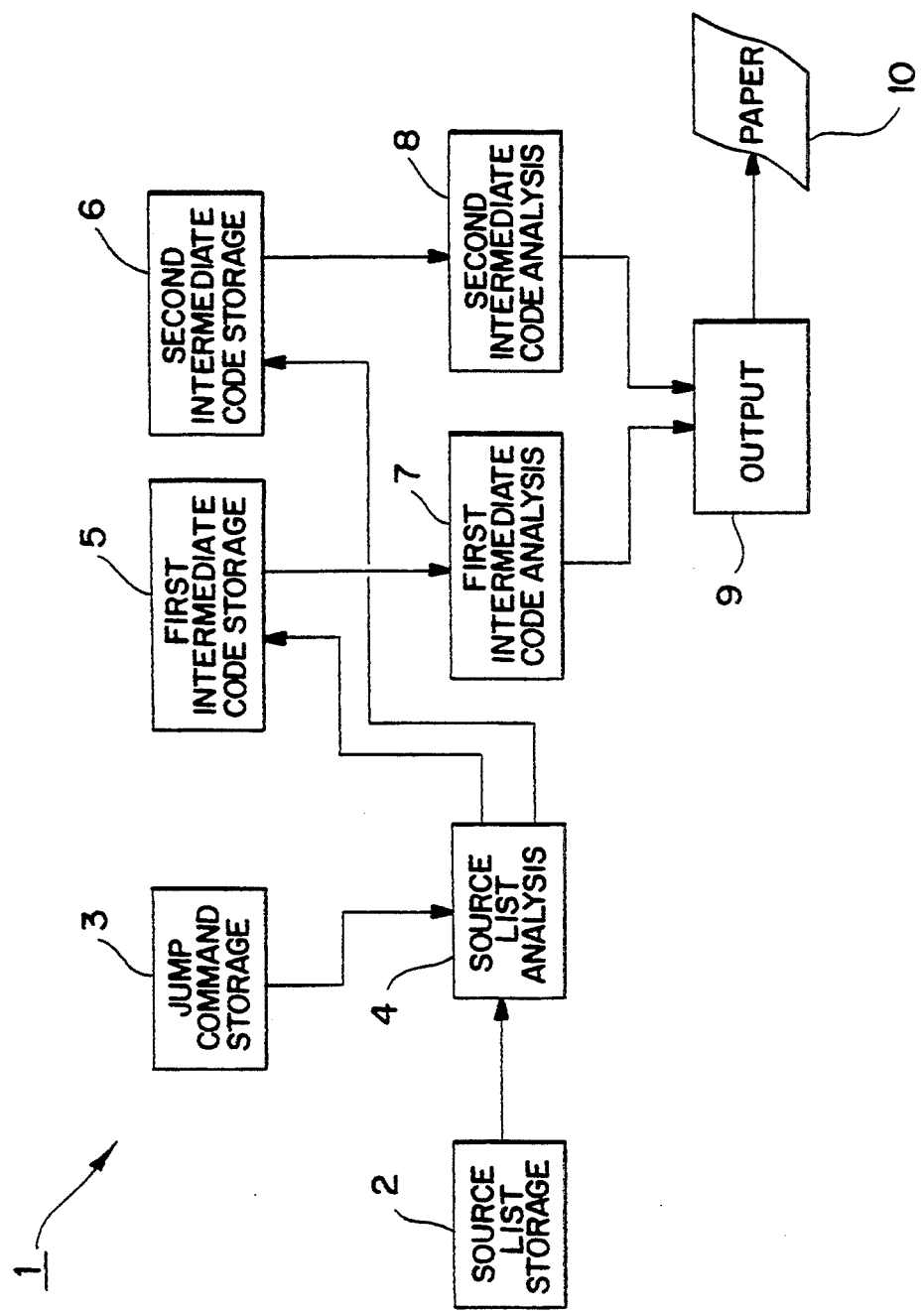
FIG. 1 is a block diagram illustrating an apparatus according to the invention.

FIG. 1 diagrammatically illustrates an apparatus for automatically preparing a flowchart according to the invention. The apparatus 1 shown in FIG. 1 comprises a source list memory 2. The source list memory 2 is an external storage device such as a hard disk storage device or a floppy disk storage device. A source program written in an assembler language which corresponds to the type of a microcomputer to which the program is applied is stored as a list such as shown in Table 1 below, for each line number.

Jump commands employed in the assembler language are previously stored in a jump code memory 3. In this example, jump commands are those shown in Table 2 below. In Table 2, "@" indicates a label of the jump destination line.

TABLE 2

| J | P | Z , @ |
| J | P | N Z , @ |
| J | R | Z , @ |
| J | R | N Z , @ |

TABLE 1

| 1 | | :******************* | |
| 2 | | :* CHARDERR HANDLE * | |
| 3 | | :* INPUT NONE * | |
| 4 | | :* OUTPUT NONE * | |
| 5 | | :******************* | |
| 6 | cHARDERR: | | |
| 7 | | PUSH IX | |
| 8 | | PUSH HL | |
| 9 | | PUSH DE | |
| 10 | | CP jMERLTIM | :LOADING TIME OVER? |
| 11 | | JR Z, 10$ | |
| 12 | | CP jMERHEAD | :HEAD SWITCH ERROR |
| 13 | | JR Z, 10$ | |
| 14 | | CP jMEREBOT | :EOT, BOT |
| 15 | | JR Z, 20$ | |
| 16 | | CP jMERTAPE | :TAPE ERROR |
| 17 | | JR Z, 20$ | |
| 18 | | CP jMERNORM | |
| 19 | | JR Z, cHARDERR | :NORMAL |
| 20 | 10$: | SET 0, (HL) | :SET DISPLAY BIT |
| 21 | | SET bSCFLGHA, (IX) | :SET FLAG SCSI |
| 22 | 20$: | JK Z, 100$ NORMAL → | :IF NOT DEW THEN |
| 23 | | SET 1, (HL) | :DEW FOR DISPLAY |
| 24 | | SET bSCFLGHA, (IX) | :SET SCSI FLAG |
| 25 | 100$ | POP DE | |
| 26 | | POP HL | |
| 27 | | POP IX | |
| 28 | | RET | |

The source program stored in the source list memory 2 is sequentially compared for each command with the jump commands which are stored in the jump command memory 3, by a source list analyzer 4. As described below, first intermediate codes and second intermediate codes are generated, and stored in intermediate code memories 5 and 6, respectively. The first intermediate codes include CODE(*, 1), CODE(*, 2), and CODE(*, 3). The second intermediate codes include LA(*, 1) LA(*, 2) LA(*, 3) and LA(*, 4).

The first and second intermediate codes stored respectively in the memories 5 and 6 are analyzed along with the processing described later, by corresponding analyzers 7 and 8. The results of these analyses are input to an output device 9 such as that including a plotter, and a flowchart is drawn on recording paper 10.

Figure 2:
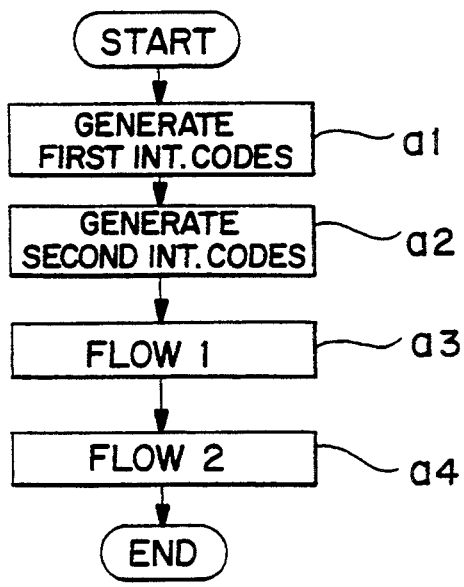
FIG. 2 is a flowchart illustrating the basic operation of the apparatus of FIG. 1.

FIG. 2 illustrates the basic operation of the apparatus 1. In this embodiment, the first and second intermediate codes are created at steps a1 and a2 by the source list analysis means 4. Then, flowchart preparing programs "Flow 1" and "Flow 2" are executed by the output device 9 to draw a flowchart.

Figure 3A:
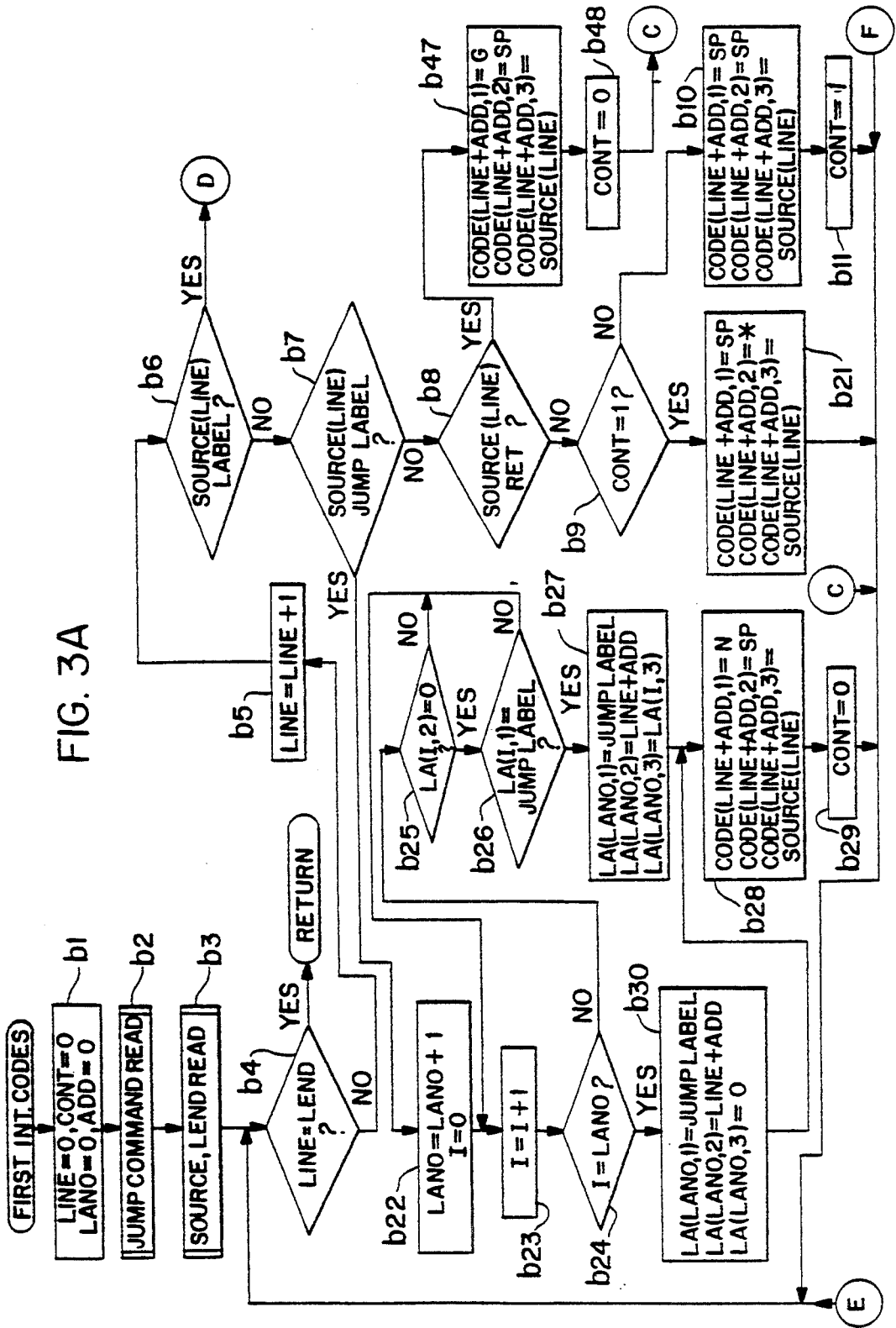
FIGS. 3A and 3B illustrate the operation of obtaining first intermediate codes in the apparatus of FIG. 1.
Figure 3B:
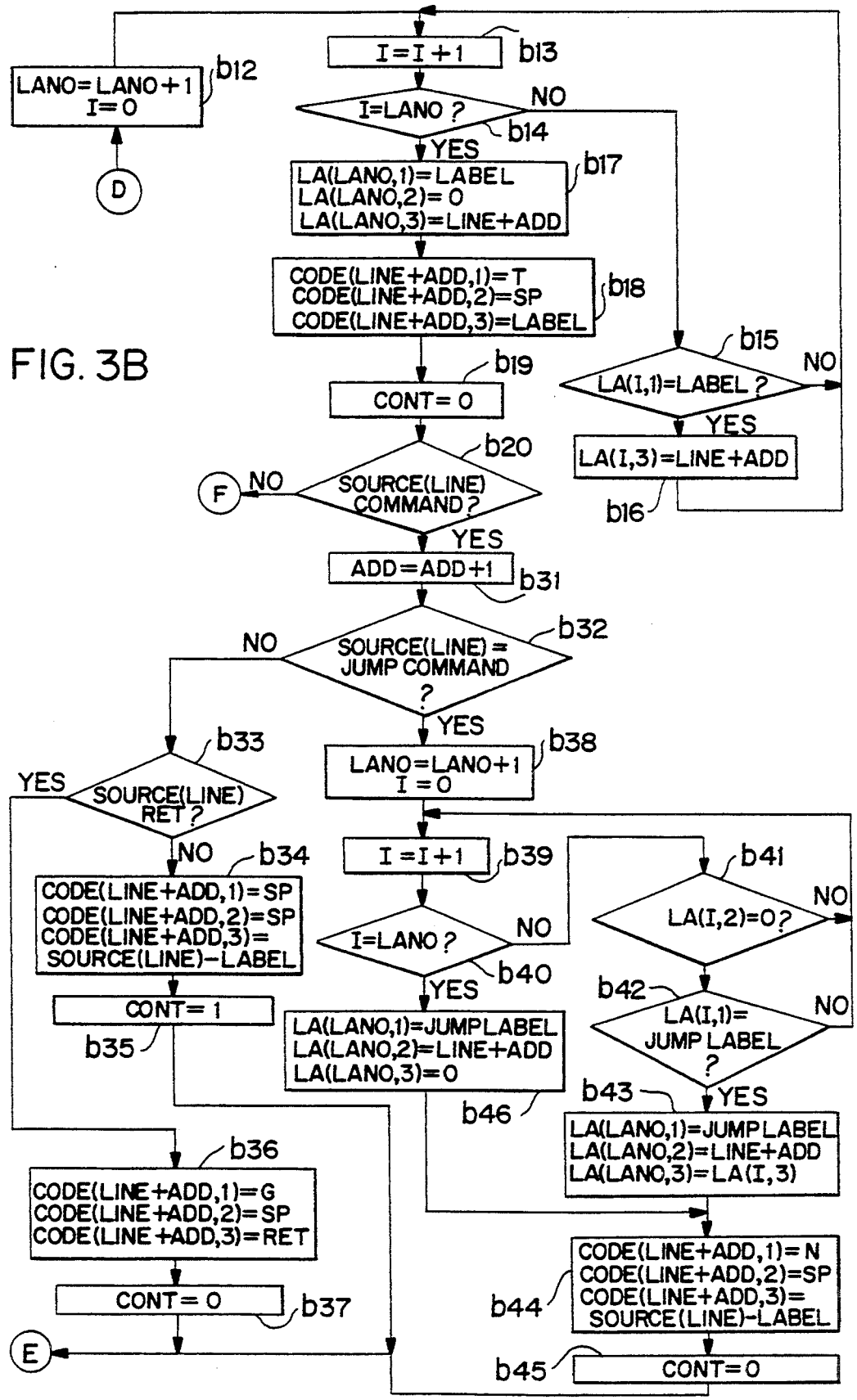

FIGS. 3A and 3B illustrate the flow of generating the first intermediate codes and second intermediate codes. In step b1 all of variables used for processing, LINE, CONT, LANO and ADD, are initialized to 0. Then, in step b2 the jump commands stored in the jump command memory 3 are read out. The source program stored in the source list memory 2 is read out, and the largest line number LEND is read (step b3).

In step b4, it is determined whether or not the line number LINE which is the line number of the source program is equal to the largest line number LEND. When it is equal, the processes described below are all brought to a conclusion, and processing returns to the main routine. When the determination in step b4 is negative, the line number LINE is incremented by 1 (step b5). In step b6, it is determined whether or not a label is included in the function SOURCE(LINE) which indicates the command of the source program corresponding to the line number LINE. For line numbers 1 through 5 of the source program, the determinations in step b6 are all negative. It is determined in step b7 whether or not any of the previously-stored jump commands is included in the commands of the corresponding line number, and in step b8 it is determined whether or not the command is RET. For line numbers 1 through 5, these all become negative.

In step b9, it is determined whether a variable CONT is "1" or not. The variable CONT is defined as follows: when there is no possibility that the next line is a continuation line, the variable CONT is 0; and when there is possibility that the next line is a continuation line, the variable CONT is 1. If no in step b9, the process moves to step b10 where the intermediate codes CODE(*, 1) and CODE(*, 2) are provided with the space symbol and the other intermediate code CODE(*, 3) is set to the corresponding command. In step b11, the variable CONT is set to "1", and processing returns to step b4 to repeat the above process for each line. In the program shown in Table 1, a label is included in some of lines beginning with line number 6. For these lines including a label, the determination in step b6 becomes affirmative, and processing moves to step b12 (FIG. 3B). In step b12, the line number LANO of the second intermediate codes (Table 4) is incremented by 1, and the variable I which indicates one of the lines in Table 4 is initialized to 0.

TABLE 3

| LINE | CODE(*,1) | CODE(*,2) | CODE(*,3) |
|---|---|---|---|
| 1 | | | :******************* |
| 2 | | * | :* CHARDERR HANDLE * |
| 3 | | * | :* INPUT NONE * |
| 4 | | * | :* OUTPUT NONE * |
| 5 | | * | :******************* |

TABLE 3-continued

| LINE | CODE(*,1) | CODE(*,2) | CODE(*,3) |
|---|---|---|---|
| 6 | T | | CHARDERR |
| 7 | | | PUSH IX |
| 8 | | * | PUSH HL |
| 9 | | * | PUSH DE |
| 10 | | * | CP JMERLTIM |
| 11 | N | | JR Z, 10$001 |
| 12 | | | CP JMERHEAD |
| 13 | N | | JR Z, 10$001 |
| 14 | | | CP JMEREBOT |
| 15 | N | | JR Z, 20$002 |
| 16 | | | CP JMERTAPE |
| 17 | N | | JR Z, 20$002 |
| 18 | | | CP JMERNORM |
| 19 | N | | JR Z, CHARDERR |
| 20 | T | | 10$001 |
| 21 | | | SET 0, (HL) |
| 22 | | * | SET BSCFLGHA, (IX) |
| 23 | T | | 20$002 |
| 24 | N | | JR Z, 100$003 |
| 25 | | | SET 1, (HL) |
| 26 | | * | SET BSCFLGHA, (IX) |
| 27 | T | | 100$003 |
| 28 | | | POP DE |
| 29 | | * | POP HL |
| 30 | | * | POP IX |
| 31 | G | | RET |

TABLE 4

| LANO | L(*,2) | LA(*,2) | LA(*,3) | LA(*,4) |
|---|---|---|---|---|
| 1 | CHARDER | 0 | 6 | 0 |
| 2 | 10$001 | 11 | 20 | 9 |
| 3 | 10$001 | 13 | 20 | 7 |
| 4 | 20$002 | 15 | 23 | 8 |
| 5 | 20$002 | 17 | 23 | 6 |
| 6 | CHARDER | 19 | 6 | −13 |
| 7 | 10$001 | 0 | 20 | 0 |
| 8 | 20$002 | 0 | 23 | 0 |
| 9 | 100$003 | 24 | 27 | 3 |
| 10 | 100$003 | 0 | 27 | 0 |

In step b13, the variable I is increased by an increment of +1, and then in step b14 it is determined whether or not the variable I matches with the line number LANO. When it does not match, it is determined at step b15 whether or not the second intermediate code LA(*, 1) of the line number I (i.e., LA(I, 1)) is a label. When LA(I, 1) is not a label, processing returns to step b13. When LA(I, 1) is a label (e.g., for line number 6), processing moves to step b16 where the intermediate code LA(I, 3) is set to LINE+ADD, i.e., $$LA(I, 3) = LINE + ADD \quad (1)$$

and processing is returned to step b13.

When the determination in step b14 is affirmative (i.e., I=LANO), processing moves to step b17 where, for the new line number LANO, the second intermediate code LA(LANO, 1) is set to a label, LA(LANO, 2) is set to 0, and LA(LANO, 3) is set to LINE+ADD, i.e., $$LA(LANO, 3) = LINE + ADD \quad (2)$$

In step b18, the first intermediate codes CODE(*, 1), CODE(*, 2) and CODE(*, 3) are set in accordance with the contents of line number "*" as follows.

$$
\begin{aligned}
CODE(*, 1) &= T \text{ (line number ``*'' = label)} \\
&= N \text{ (line number ``*'' = jump command)} \\
&= G \text{ (line number ``*'' = } RET \text{ statement)} \\
&= \text{space (line number ``*'' = another command)}
\end{aligned}
\quad (3)
$$

$$
\begin{aligned}
CODE(*, 2) &= \text{(line number ``*'' = continuation line)} \\
&= \text{space (line number ``*'' = first command in one block of the flowchart or monadic)}
\end{aligned}
\quad (4)
$$

$$CODE(*, 3) = \text{command or label of line number ``*''} \quad (5)$$

For line number 6, for example, CODE(*, 1) is set to T, CODE(*, 2) to include the space symbol, and CODE(*, 3) to include the label in line number 6. The variable CONT is set to 0 in step b19.

In step b20, it is determined whether or not a command is further described on the same line where a label has been detected. This becomes negative for line number 6 of the source program, and processing returns to step b4.

As shown in Table 1, line number 7 includes a command other than a jump command, and does not include a label. Therefore, processing passes through steps b4, b5, b6, b7, b8, b9, b10 and b11, and returns to step b4. When processing for line number 8 reaches step b9, the determination in step b9 is affirmative, and then the first intermediate codes CODE(*, 1), CODE(*, 2) and CODE(*, 3) for line number 8 are produced in step b21 in accordance with above-mentioned definitions (3) to (5) of Formula 3 through Formula 5, and processing returns to step b4. The same kind of processing is performed for succeeding lines up to line number 10. For line number 11, the determination in step b7 is affirmative, and processing moves to step b22. Then, in steps b23 and b24 the same processes are performed as in steps b12, b13 and b14.

When the determination in step b24 is negative, processing moves to step b25 where it is determined whether the second intermediate code LA(I, 2) is 0 or not. When this determination is negative, processing returns to step b23. When it is affirmative, it is determined in step b26 whether or not the second intermediate code LA(I, 1) which has the same variable for the line number is the jump destination label. When this is negative, processing returns to step b23. When this is affirmative, processing moves to step b27 where the second intermediate codes LA(*, 1), LA(*, 2) and LA(*, 3) are set as follows.

$$
\begin{aligned}
LA(*, 1) &= \text{label of line number ``*'' or the jump destination data when line number ``*'' is a jump command}
\end{aligned}
\quad (6)
$$

$$
\begin{aligned}
LA(*, 2) &= 0 \text{ (line number ``*'' = label)} \\
&= n \text{ (line number)(line number ``*'' = jump command)}
\end{aligned}
\quad (7)
$$

$$
\begin{aligned}
LA(*, 3) &= \text{jump destination data of a jump command}
\end{aligned}
\quad (8)
$$

In step b28, the first intermediate codes CODE(LINE+ADD, 1), CODE(LINE+ADD, 2) and CODE(LINE+ADD, 3) for the command of the line number LINE+ADD are set based upon the definitions (3) to (5). The variable CONT is set to 0 in step b29, and processing returns to step b4.

When the determination in step b24 is affirmative, in step b30 the second intermediate codes LA(LANO, 1), LA(LANO, 2) and LA(LANO, 3) which arise from the latest line number LANO are set based upon the definitions (6) to (8), and processing moves to step b28.

When processing proceeds in this way to reach line number LINE=22 of the source program, the determination in step b20 is affirmative, processing proceeds to step b31, and the variable ADD is incremented by 1. In step b32, it is determined whether or not the command is a jump command. If NO in step b32, processing moves to step b33 where it is determined whether or not the command is the RET command. When this is negative, the first intermediate codes CODE(LINE+ADD, 1), CODE(LINE+ADD, 2) and CODE(LINE+ADD, 3) are set based upon the definitions (3) to (5). Then, the variable CONT is set to 1 (step b35), and processing returns to step b4.

When a label and jump command are written in the same line (as in the case of line number LINE=22 of the source program), the determination in step b32 is affirmative, and processing moves to step b38 where the line number LANO is incremented by 1 and the variable I is set to 0. The variable I is incremented by 1 in step b39, and it is determined in step b40 whether or not the variable I matches the line number LANO. When this is negative, processing moves to step b41 where it is determined whether the second intermediate code LA(I, 2) for the line number of the variable I is 0 or not. When this is affirmative, then it is determined in step b42 whether or not the second intermediate code LA(I, 1) of the variable I is a jump destination label.

When the determination in step b41 or b42 is negative, processing returns to step b39. When the determination in step b42 is affirmative, the second intermediate codes LA(LANO, 1), LA(LANO, 2) and LA(LANO, 3) are set in step b43 based upon the definitions (6) to (8). Then, the first intermediate codes CODE(LINE+ADD, 1), CODE(LINE+ADD, 2) and CODE(LINE+ADD, 3) are set in step b44 based upon the definitions (3) to (5). In step b45, the variable CONT is set to 0, and processing returns to step b4.

When the determination in step b8 is affirmative (that is when a line including a label also includes the RET command), processing moves to step b47 where the first intermediate codes CODE(LINE+ADD, 1), CODE(LINE+ADD, 2) and CODE(LINE+ADD, 3) are set based upon the definitions (3) to (5). Then, in step b48, the variable CONT is set to 0, and processing returns to step b4.

In this way, the first intermediate codes CODE(*, 1), CODE(*, 2) and CODE(*, 3), and the second intermediate codes LA(*, 1), LA(*, 2) and LA(*, 3) are obtained as shown in Tables 3 and 4, respectively, by the source list analysis means 4. These first and second intermediate codes are stored in the memories 5 and 6, respectively.

Figure 4:
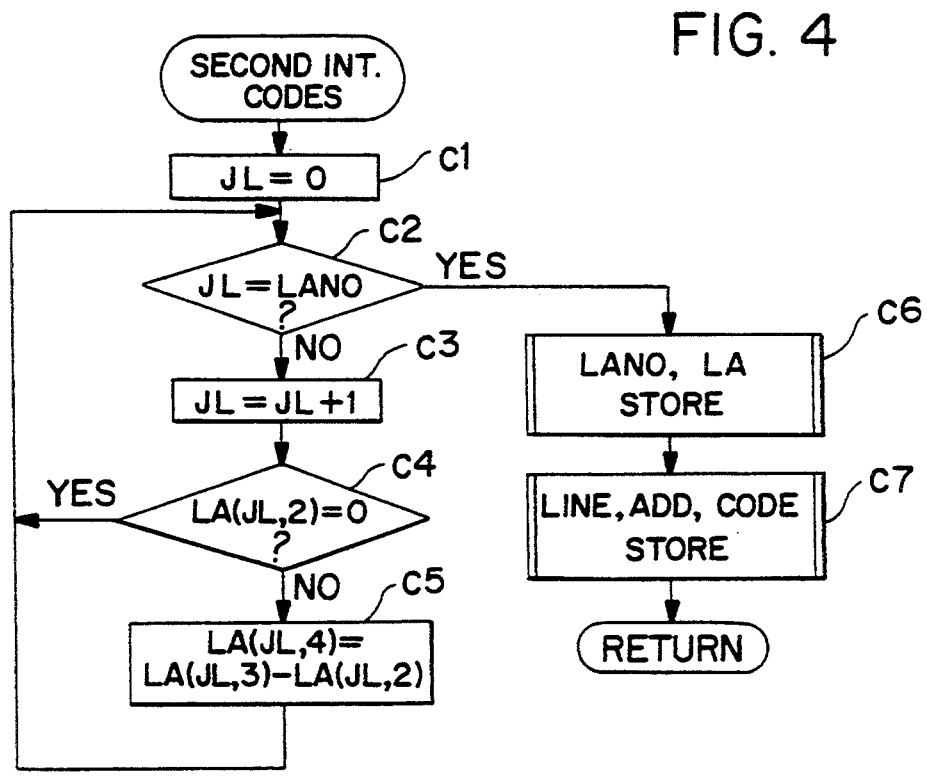
FIG. 4 illustrates the operation of obtaining second intermediate codes in the apparatus of FIG. 1.

FIG. 4 illustrates the process of obtaining the second intermediate code LA(*, 4). In step c1, the variable JL for the line number is initialized to 0. Then, in step c2, it is determined whether or not the variable JL matches the line number LANO of the second intermediate code. When this is negative, the variable JL is incremented by 1 (step c3). In step c4, it is determined whether the second intermediate code LA(JL, 2), which corresponds to the variable "JL" at this time, is 0 or not.

When the determination in step c4 is negative, the operation $$LA(JL, 4) = LA(JL, 3) - LA(JL, 2) \quad (9)$$

is executed in step c5 to obtain the second intermediate code LA(JL, 4). When the determination in step c4 is affirmative (i.e., when LA(JL, 1) is a label), processing returns to step c2.

When the determination in step c2 is affirmative, the second intermediate codes LA(*, 1), LA(*, 2) and LA(*, 3) and LANO are stored in the memory 6 (step c6). Further, the variables LINE, ADD and CODE are stored in the same way.

Figure 5:
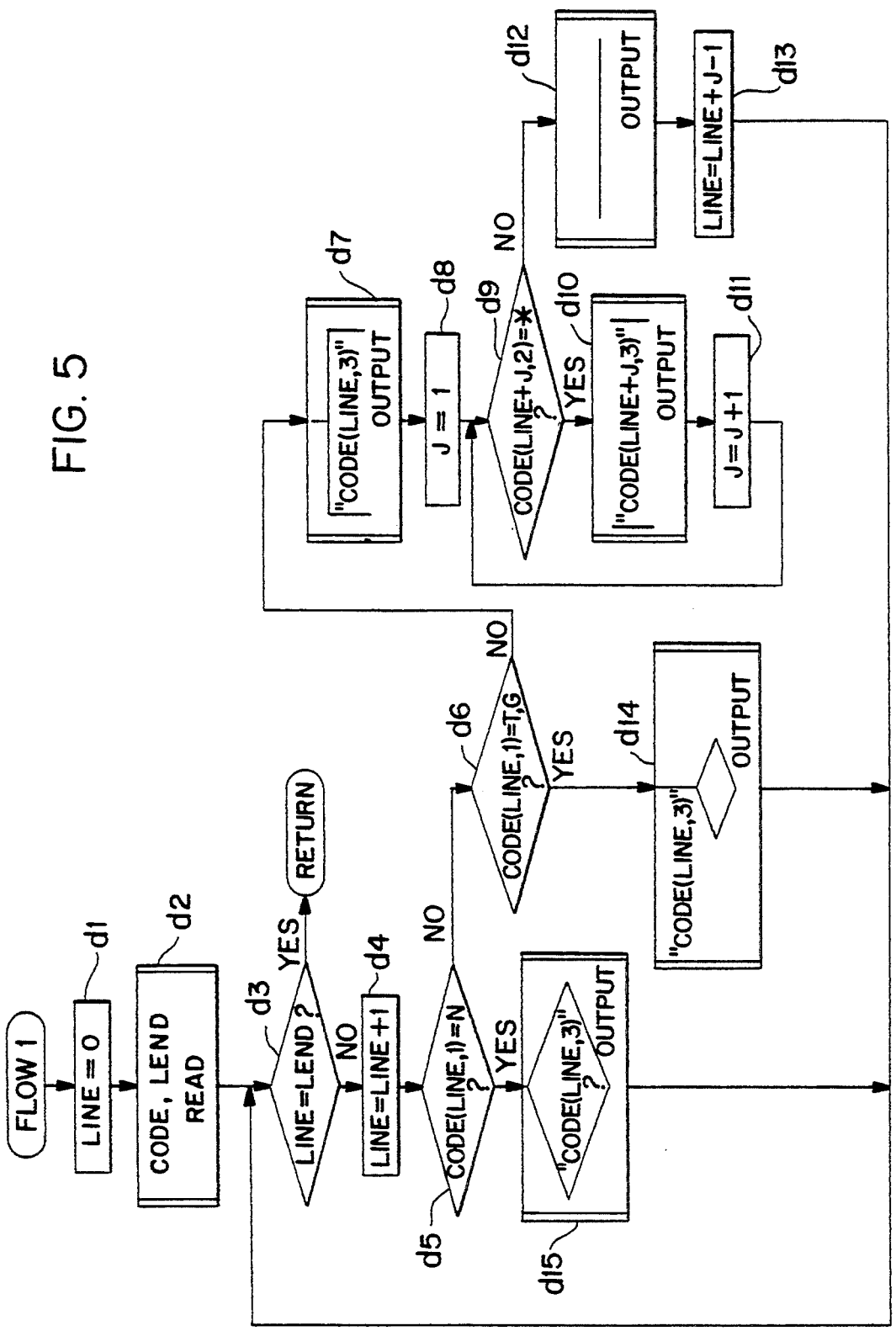
FIGS. 5 and 6 illustrate the operation of drawing a flowchart in the apparatus of FIG. 1.
Figure 6:
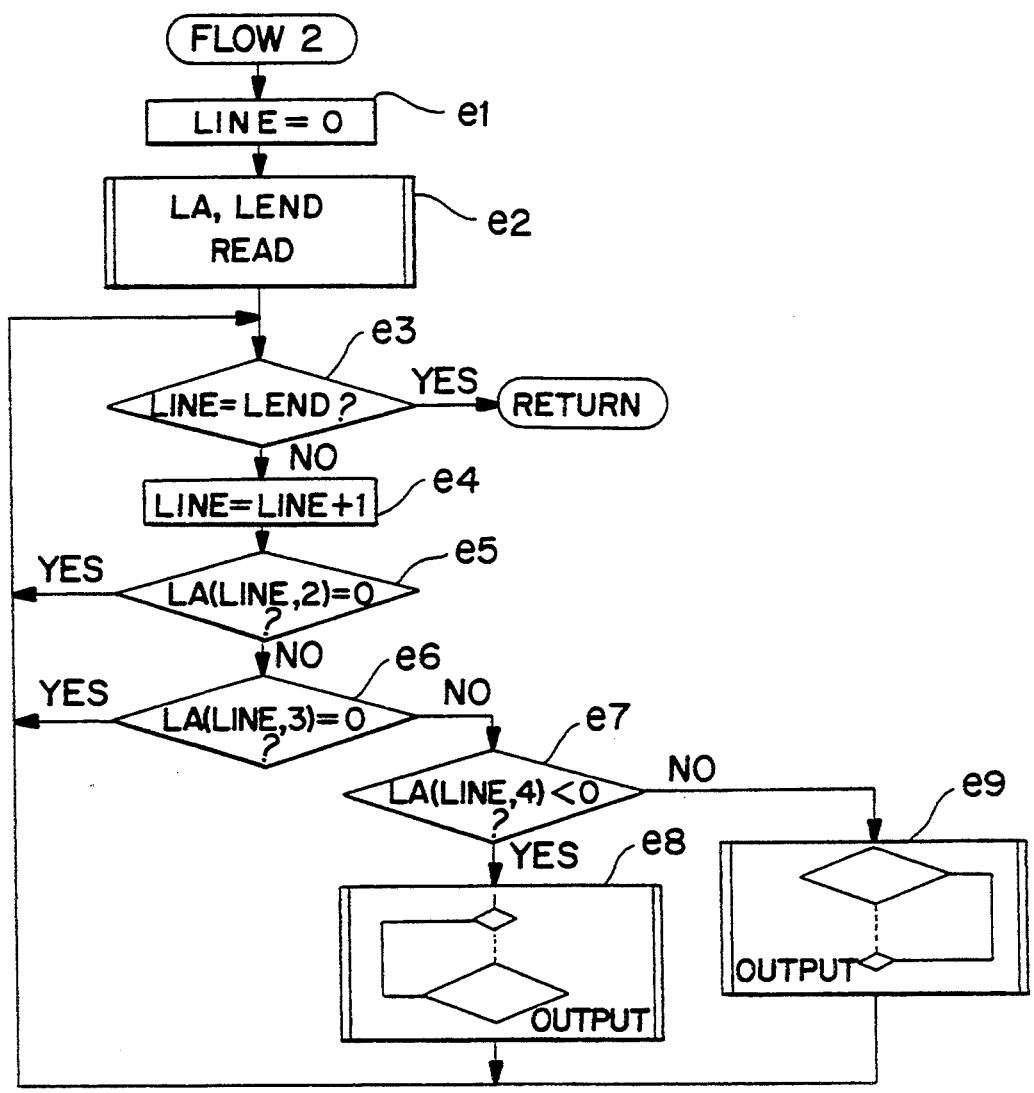
Figure 7:
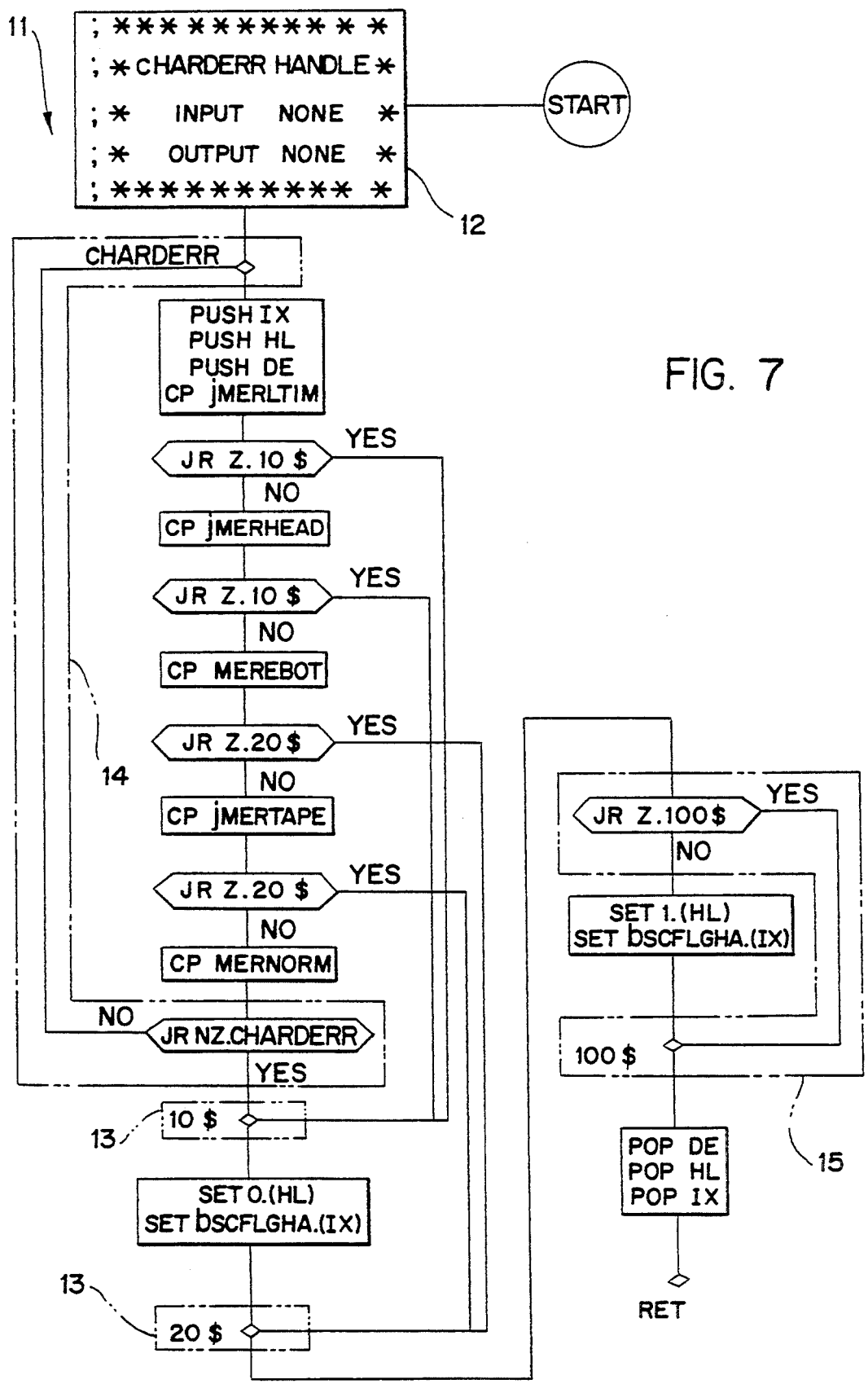
FIG. 7 shows an example of a flowchart prepared by the apparatus of FIG. 1.

FIGS. 5 and 6 illustrate the operation of the flowchart preparing programs "Flow 1" and "Flow 2" by which the analysers 7 and 8 and the output device 9 are controlled. FIG. 7 is a diagram showing an example of a flowchart which is prepared by this embodiment. In step d1, the variable LINE for the line number is initialized to 0. The first intermediate codes and final line data are read in step d2. In step d3, it is determined whether or not the variable LINE has reached the final line number LEND, and when this is affirmative processing returns to other process. When this is negative, the variable LINE is increased by an increment of +1 in step d4. In step d5, it is determined whether or not the first intermediate code CODE(LINE, 1) for the line number LINE is equal to N, that is, whether or not the command for the line number LINE is a jump command.

When this determination is negative, it is determined in step d6 whether or not the first intermediate code CODE(LINE, 1) for the line number LINE is T or G (that is, whether or not the command for line number LINE is a label or the RET command). When this is negative, the upper portion of a process symbol 12 shown in FIG. 7 is drawn, and the contents of CODE(LINE, 3) are drawn in the symbol (step d7). The variable J is set to 1 (step d8).

In step d9, it is determined whether or not the first intermediate code CODE(LINE+J, 2) is equal to "*" (that is, whether or not the command of the questioned line number is a continuation line which is a command having processing contents that continue from the command of the previous line). When this is affirmative, the vertical parallel lines which continue from the upper portion of the process symbol 12 are drawn in step d10, and the contents of CODE(LINE+J, 3) are drawn between the lines. In step d11, the variable J is increased by an increment of +1, and processing is moved to step d9. These processes are repeated for line numbers 7 through 10 of the source program. For line number 11 of the first intermediate code shown in the Table 3, the determination in step d9 is negative. Then, processing moves to step d12, and a horizontal ruled line which constitutes the lower portion of the process symbol 12 is drawn. In step d13, the operation $$LINE = LINE + J - 1 \quad (10)$$

is performed for the line number LINE, and processing is returned to step d3.

When the determination of step d6 is affirmative, the questioned command is a command for a jump destination corresponding to a jump command at another place, or the RET command which is a command for termination of the subroutine program. In step d14, a branch destination symbol 13 shown in FIG. 7 is drawn, and the label is drawn in the vicinity of the symbol 13. Thereafter, processing returns to step d3.

FIG. 6 is a flowchart showing the next operation example relating to the output of the flowchart mentioned below. In step e1, the line number LINE is set to 0. All data of the second intermediate codes of the Table 4 and the final line data LEND of the source program are read out (step e2). In step e3, it is determined whether or not the line number LINE, which is a variable, matches the largest line number LEND. If YES, then processing is finished. If NO, then processing moves to step e4 where the line number LINE is increased by an increment of +1.

Then, it is determined whether or not the second intermediate code LA(LINE, 2) is 0 (that is, whether or not the command for the line number LINE is a label) (step e5). When this is affirmative, processing returns to step e3. When this is negative, processing moves to step e6 where it is determined whether or not the second intermediate code LA(LINE, 3) is 0 (that is, whether or not the jump destination data included in the command is 0 when the command of the line number LINE is a jump command). When this is affirmative, processing returns to step e3, and when this is negative it moves to step e7.

In step e7, it is determined whether or not the second intermediate code LA(LINE, 4) is negative (that is, whether or not the jump destination is a smaller line number than the line number LINE when the command of the line number LINE is a jump command). When this is affirmative, processing moves to step e8 where a symbol 14 shown in FIG. 7 is drawn. The symbol 14 indicates a path where processing jumps to the smaller line number as shown in FIG. 7. After step e8, processing returns to step e3. When the determination in step e7 is negative, processing moves to step e9 where a symbol 15 shown in FIG. 7 is drawn. The symbol 15 indicates that processing jumps to jump destinations with the larger line number. Then, processing returns to step e3.

In this way, the flowchart 11 shown in FIG. 7 is drawn based upon the operations of the analyzers 7 and 8 and the output device 9.

According to this embodiment, the jump commands of Table 2 in the special jump command memory 3 with relation to the operating program shown in Table 1, and the contents of the source program are converted into the first and second intermediate codes of Table 3 and Table 4. Based upon these first and second intermediate codes, it is possible to automatically print out the flowchart 11 illustrated in FIG. 7. Therefore, it is unnecessary to redraw the flowchart through visual checking, even when a change is made in the source program after the flowchart 11 has once been prepared, and thus it is possible to obtain both greater efficiency in debugging operations and the prevention of errors.

Furthermore, even in a case where the microcomputer being used is changed to another type, and consequently the assembler language which describes the commands is changed, a flowchart can be output with the same processing procedure as the processing procedure described above, by changing the jump commands stored in the jump command memory 3. It is therefore possible to realize an automatic flowchart preparing apparatus which has versatility regardless of the type of assembler language.

According to the invention, a source program can easily be converted into a flowchart, whereby debugging efficiency can be markedly improved as compared with the case of debugging by visual observation of the command sequence, and the occurrence of errors can also be prevented at the time of debugging. Furthermore, even in a case where a change occurs in the source program after a flowchart has once been prepared, the labor required to change the flowchart can be markedly reduced, because the flowchart can be prepared automatically. Even in a case where the language which describes the source program is changed, a flowchart can easily be prepared based upon the new language in the same way as in the above description, by changing the format of the jump commands which are stored in the jump command memory so as to correspond to the new language. Accordingly, operability is markedly improved.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. An apparatus for automatically preparing a flowchart of a source program having more than two different command types, the apparatus comprising:
source program storage means for storing lines of the source program;
jump command storage means for previously storing as a group a list consisting of jump commands used in an assembler language for the source program;
identification data producing means, coupled to said source program storage means and said jump command storage means, for judging whether or not a jump command is included in a line of the source program by comparing the lines of the source program with the jump commands stored in the jump command storage means and for producing and respectively grouping first and second identification data in accordance with the judging result,
said first identification data respectively being designated for each command of the source program to uniquely identify command type and to identify if execution contents of other commands immediately preceding and following a particular command along a command sequence of the source program are to be executed sequentially,
said first identification data including:
first data indicative of the command type, having label, jump command, return command and other command types,
second data indicative that a corresponding line of the source program is a continuation line or a first command in a block, and
third data descriptive of a command or label,
said second identification data respectively being designated for each jump command to identify which address of a command is to be jumped to;

identification data storage means, coupled to said identification data producing means, for storing said first and second identification data as respective groups;

analysis means, coupled to said identification data storage means, for analyzing a value of said first identification data stored in said identification data storage means to generate a plurality of drawing elements of the flowchart and for analyzing a value of said second identification data stored in said identification data storage means to generate at least a drawing line connecting one of the plurality of drawing elements to another of the plurality of drawing elements; and output means, coupled to said analysis means, for outputting the plurality of drawing elements and at least the drawing line of the flowchart of the source program.

2. The apparatus for automatically preparing a flowchart according to claim 1, wherein said second identification data includes first data indicative of an address of a command which is to be jumped to.

3. The apparatus for automatically preparing a flowchart according to claim 2, wherein the address is a relative address.

4. The apparatus for automatically preparing a flowchart according to claim 1, wherein said second identification data includes second data indicative of a location of the jump command and third data indicative of the location of a command which is to be jumped to.

5. The apparatus for automatically preparing a flowchart according to claim 4, wherein said second identification data further includes fourth data indicative of difference between said second data and said third data.

* * * * *